(12) United States Patent
Kurita

(10) Patent No.: US 8,910,207 B2
(45) Date of Patent: Dec. 9, 2014

(54) ELECTRONIC APPARATUS, METHOD OF CONTROLLING ELECTRONIC APPARATUS, AND COMPUTER-READABLE STORAGE MEDIUM

(71) Applicant: Kabushiki Kaisha Toshiba, Minato-ku, Tokyo (JP)

(72) Inventor: Yukihiro Kurita, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/675,859

(22) Filed: Nov. 13, 2012

(65) Prior Publication Data

US 2013/0239144 A1 Sep. 12, 2013

(30) Foreign Application Priority Data

Mar. 8, 2012 (JP) .................................. 2012-052287

(51) Int. Cl.
*G06F 3/00* (2006.01)
*G06F 13/00* (2006.01)
*H04N 5/445* (2011.01)
*H04N 21/431* (2011.01)

(52) U.S. Cl.
CPC .................................. *H04N 21/431* (2013.01)
USPC ............................................... 725/40; 725/48

(58) Field of Classification Search
None
See application file for complete search history.

(56) References Cited

U.S. PATENT DOCUMENTS

| 8,225,354 | B2 * | 7/2012 | Acton et al. ..................... 725/49 |
| 2002/0135698 | A1 | 9/2002 | Shinohara |
| 2004/0078807 | A1 * | 4/2004 | Fries et al. ...................... 725/14 |
| 2009/0288119 | A1 | 11/2009 | Takahashi et al. |
| 2011/0119595 | A1 * | 5/2011 | Bydeley et al. ................. 715/738 |
| 2011/0150431 | A1 * | 6/2011 | Klappert ........................ 386/296 |
| 2012/0047528 | A1 * | 2/2012 | Seo et al. ........................ 725/32 |

FOREIGN PATENT DOCUMENTS

| JP | 2001-358672 | | 12/2001 |
| JP | 2008-252447 | | 10/2008 |
| JP | 2009-272719 | | 11/2009 |
| JP | 2011-071770 | A | 4/2011 |
| JP | 2011-239151 | A | 11/2011 |

OTHER PUBLICATIONS

Japanese Office Action for corresponding Japanese Patent Application 2012-052287, mailed Feb. 12, 2013, in 6 pages.

* cited by examiner

*Primary Examiner* — Oschta Montoya
(74) *Attorney, Agent, or Firm* — Knobbe, Martens, Olson & Bear LLP

(57) ABSTRACT

According to one embodiment, an electronic apparatus includes an acquiring module, a first output module, a second output module and a third output module. The acquiring module is configured to acquire program information via a computer network upon receipt of an instruction to acquire program information. The first outputting module is configured to create a program guide using program information acquired via a computer network. The second outputting module is configured to receive a broadcast of a program designated in the program guide. The third outputting module is configured to acquire program information of the designated program from the received broadcast of the designated program.

18 Claims, 8 Drawing Sheets

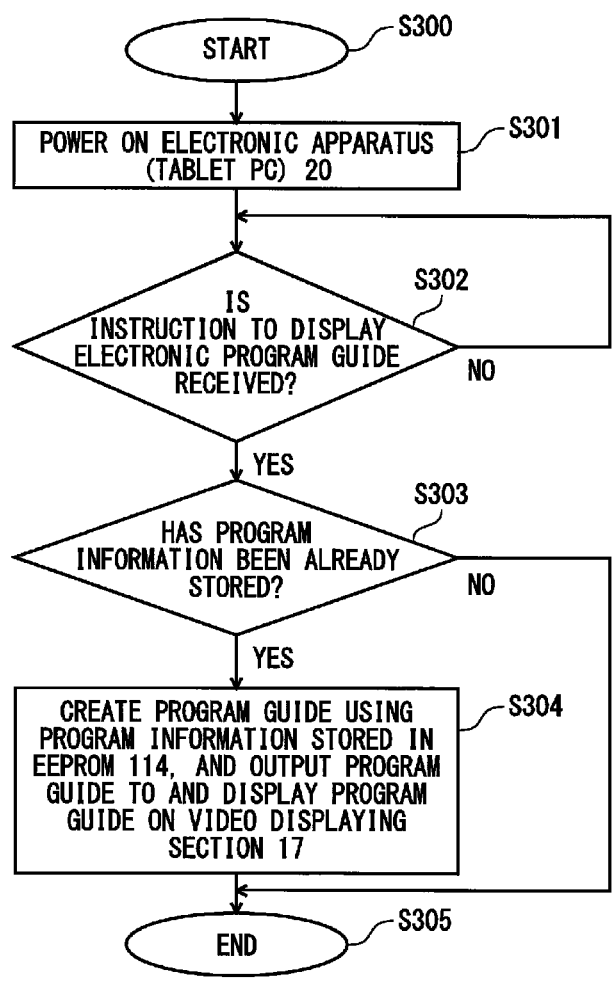

ELECTRONIC APPARATUS, METHOD OF CONTROLLING ELECTRONIC APPARATUS, AND COMPUTER-READABLE STORAGE MEDIUM

CROSS REFERENCE TO RELATED APPLICATION(S)

The present disclosure relates to the subject matters contained in Japanese Patent Application No. 2012-052287 filed on Mar. 8, 2012, which is incorporated herein by reference in its entirety.

TECHNICAL FIELD

Embodiments discussed herein relate generally to an electronic apparatus, a method of controlling the electronic apparatus, and a computer-readable storage medium storing a program that causes a computer to execute controlling of the electronic apparatus.

BACKGROUND

Recently, portable electronic apparatuses (mobile terminals) such as a tablet PC have been widely used. Among such portable electronic apparatuses, for example, a product which can receives and display a television broadcast is being in widespread use.

Usually, such a portable electronic apparatus (mobile terminal) includes, for example, a battery which is available as a driving power supply.

However, electric power accumulated in a battery is finite. Therefore, there is a demand to reduce the power consumption of an electronic apparatus (mobile terminal).

If a user is provided with, for example, program information while watching a television broadcast or the like, convenience is improved.

However, if program information is acquired from a television broadcast or the like with a tuner, the consumption amount of power accumulated in a battery may be increased in proportion to the operating time of the tuner. This is contrary to the demand that the power consumption of an electronic apparatus (mobile terminal) be reduced.

BRIEF DESCRIPTION OF THE DRAWINGS

FIG. 7 is an exemplary flowchart illustrating the operation of the electronic apparatus (tablet PC) according to the second embodiment in the case where program information has already been stored.

DETAILED DESCRIPTION

According to one embodiment, an electronic apparatus includes an acquiring module, a first output module, a second output module and a third output module. The acquiring module is configured to acquire program information via a computer network upon receipt of an instruction to acquire program information. The first outputting module is configured to create a program guide using program information acquired via a computer network. The second outputting module is configured to receive a broadcast of a program designated in the program guide. The third outputting module is configured to acquire program information of the designated program from the received broadcast of the designated program.

Hereinafter, exemplary embodiments will be described in detail with reference to the accompanying drawings.

Figure 1:
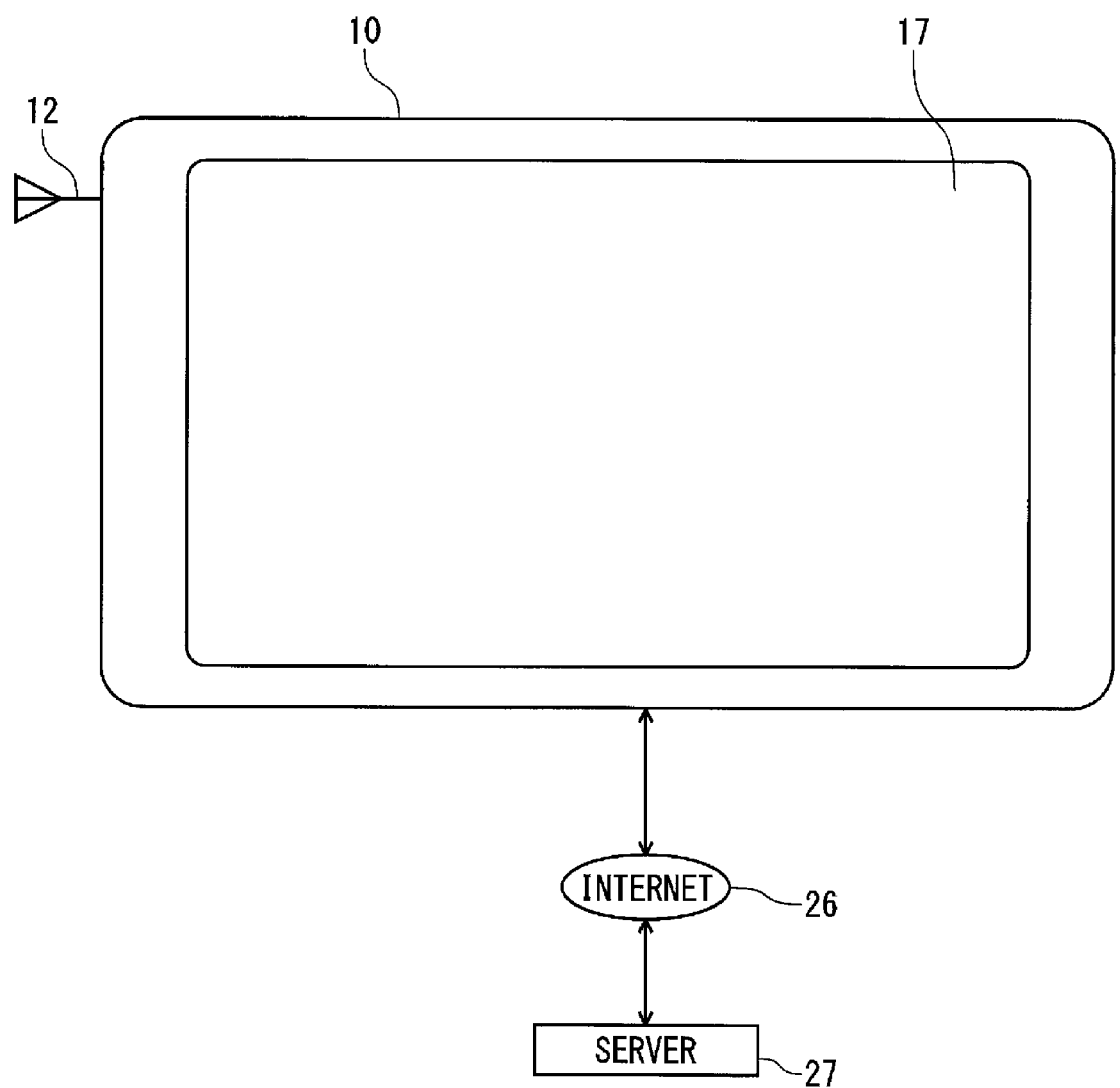
FIG. 1 is an exemplary view showing an appearance of an electronic device (tablet PC) according to a first embodiment.

FIG. 1 is an exemplary view showing an appearance of an electronic apparatus (tablet PC) according to a first embodiment.

In the first embodiment, upon receipt of an instruction to acquire program information, the electronic apparatus (tablet PC) 10 acquires the program information from a server 27 via the Internet 26.

As described later, the electronic apparatus (tablet PC) 10 generates an electronic program guide using the program information acquired via the Internet 26, and outputs it to, for example, a video displaying section 17 (for example, an liquid crystal display (LCD)).

Also, the electronic apparatus (tablet PC) 10 receives a broadcast of a program that is designated in the output electronic program guide with, for example, an antenna 12, and then output it.

Also, the electronic apparatus (tablet PC) 10 acquires the program information of the program from the received broadcast, and then outputs it to, for example, the video displaying section (LCD) 17.

The description will be made using a tablet PC as an example of the electronic apparatus 10. The invention, however, is not limited thereto. The first embodiment is applicable to various electronic apparatuses such as a notebook personal computer (PC), a smart phone, and a portable telephone, and a portable television receiver.

Figure 2:
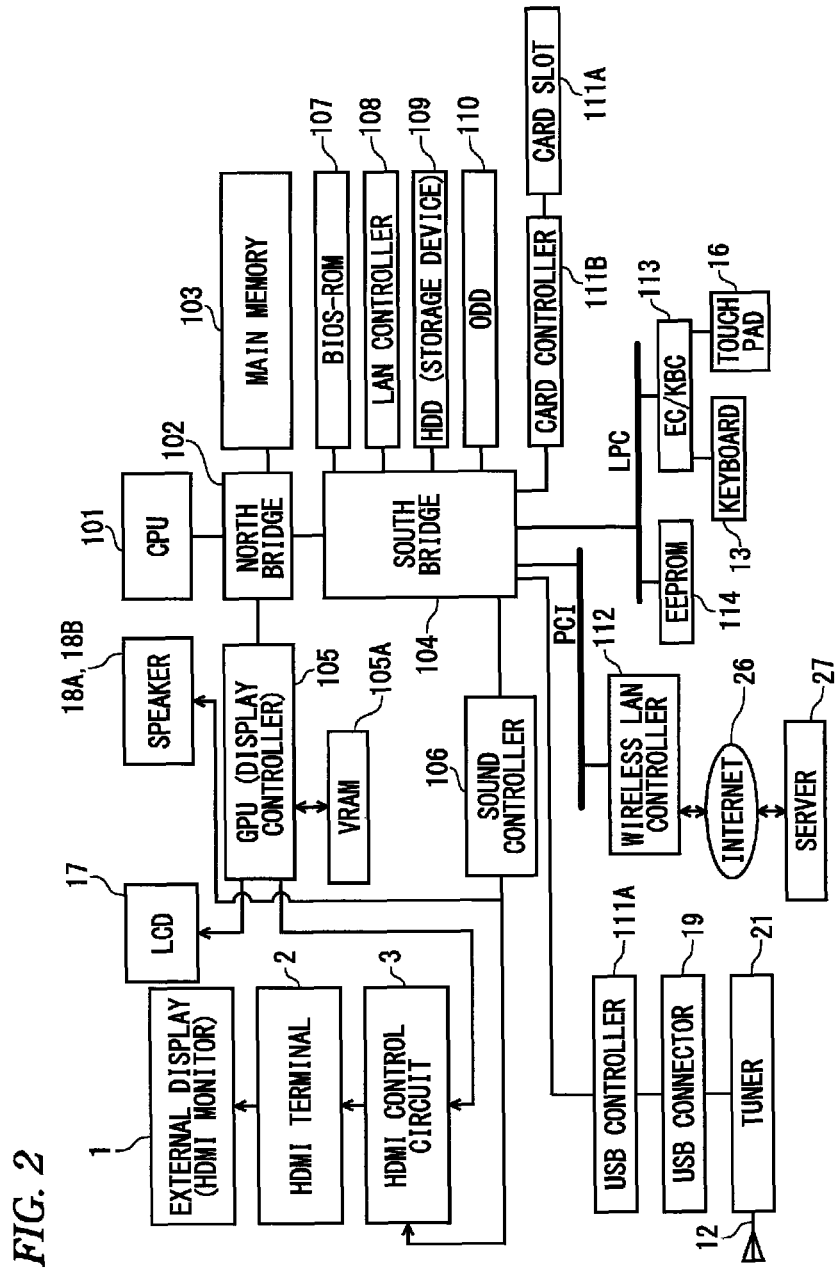
FIG. 2 is an exemplary block diagram showing an example of the configuration of the electronic apparatus (tablet PC) according to the first embodiment.

FIG. 2 is an exemplary block diagram showing an example of the configuration of the electronic apparatus (tablet PC) according to the first embodiment.

The electronic apparatus (tablet PC) 10 includes a CPU (Central Processing Unit) 101, a north bridge 102, a main memory 103, a south bridge 104, a GPU (Graphics Processing Unit) 105, a VRAM (Video RAM (Random Access Memory)) 105A, a sound controller 106, a BIOS-ROM (Basic Input/Output System-Read Only Memory) 107, a LAN (Local Area Network) controller 108, a hard disk drive (HDD (an example of a storage device)) 109, an optical disk drive (ODD) 110, a USB controller 111A, a card controller 111B, a wireless LAN controller 112, an embedded controller/keyboard controller (EC/KBC) 113, an EEPROM (Electrically Erasable Programmable ROM) 114, etc.

The CPU 101 is a processor which controls various elements of the electronic apparatus (tablet PC) 10.

The CPU 101 executes a BIOS stored in the BIOS-ROM 107. The BIOS is a program for controlling the hardware.

The north bridge 102 is a bridge device which connects between a local bus of the CPU 101 and the south bridge 104. The north bridge 102 incorporates a memory controller which controls an access to the main memory 103. For example, the north bridge 102 has also a function of communicating with the GPU 105 through a serious bus according to the PCI EPRESS standard or the like.

The GPU 105 is a display controller controlling the video displaying section (LCD) 17, which is used as a display monitor of the electronic apparatus (tablet PC) 10.

A display signal generated by the GPU 105 is sent to the video displaying section (LCD) 17. Also, the GPU 105 can transmit a digital video signal to an external display device 1 through an HDMI control circuit 3 and an HDMI terminal 2.

The HDMI terminal 2 is a terminal for connecting the external display device 1. The HDMI terminal 2 enables an uncompressed digital video signal and a digital audio signal to be transmitted through one cable to the external display device 1 such as a television receiver. The HDMI control circuit 3 is an interface for transmitting a digital video signal through the HDMI terminal 2 to the external display device 1, which may be called an HDMI monitor.

The south bridge 104 controls devices on a PCI (Peripheral Component Interconnect) bus, and those on an LPC (Low Pin Count) bus. The south bridge 104 incorporates an IDE (Integrated Drive Electronics) controller for controlling the HDD 109 and the ODD 110.

The south bridge 104 has also a function of communicating with the sound controller 106.

The sound controller 106 is a sound source device, and outputs audio data to be reproduced to speakers 18A, 18B or the HDMI control circuit 3. The LAN controller 108 is a wired communication device which executes wired communication according to, for example, the IEEE 802.3 standard. On the other hand, the wireless LAN controller 112 is a wireless communication device which executes wireless communication according to, for example, the IEEE 802.11g standard. The USB controller 111A communicates with an external apparatus (connected through a USB connector 19) according to, for example, the USB 2.0 standard.

For example, the USB controller 111A is used for receiving an image data file stored in a digital camera or the like. The card controller 111B executes writing/reading of data into/from a memory card such as an SD card inserted into a card slot provided in the computer (note PC) main body.

The EC/KBC 113 is a one-chip microcomputer in which an embedded controller for power management and a keyboard controller for controlling the keyboard 13 and the touch pad 16 are integrated. The EC/KBC 113 has a function of powering on/off the electronic apparatus (tablet PC) 10 in response to a user's operation on a power button 14.

In the first embodiment, for example, the display control is performed by having the CPU 101 execute programs stored in the main memory 103, the HDD 109, and the like.

It is noted that the above description is a mere example. The electronic apparatus of the first embodiment may be implemented by hardware which is different from the above-described one.

Figure 3A:
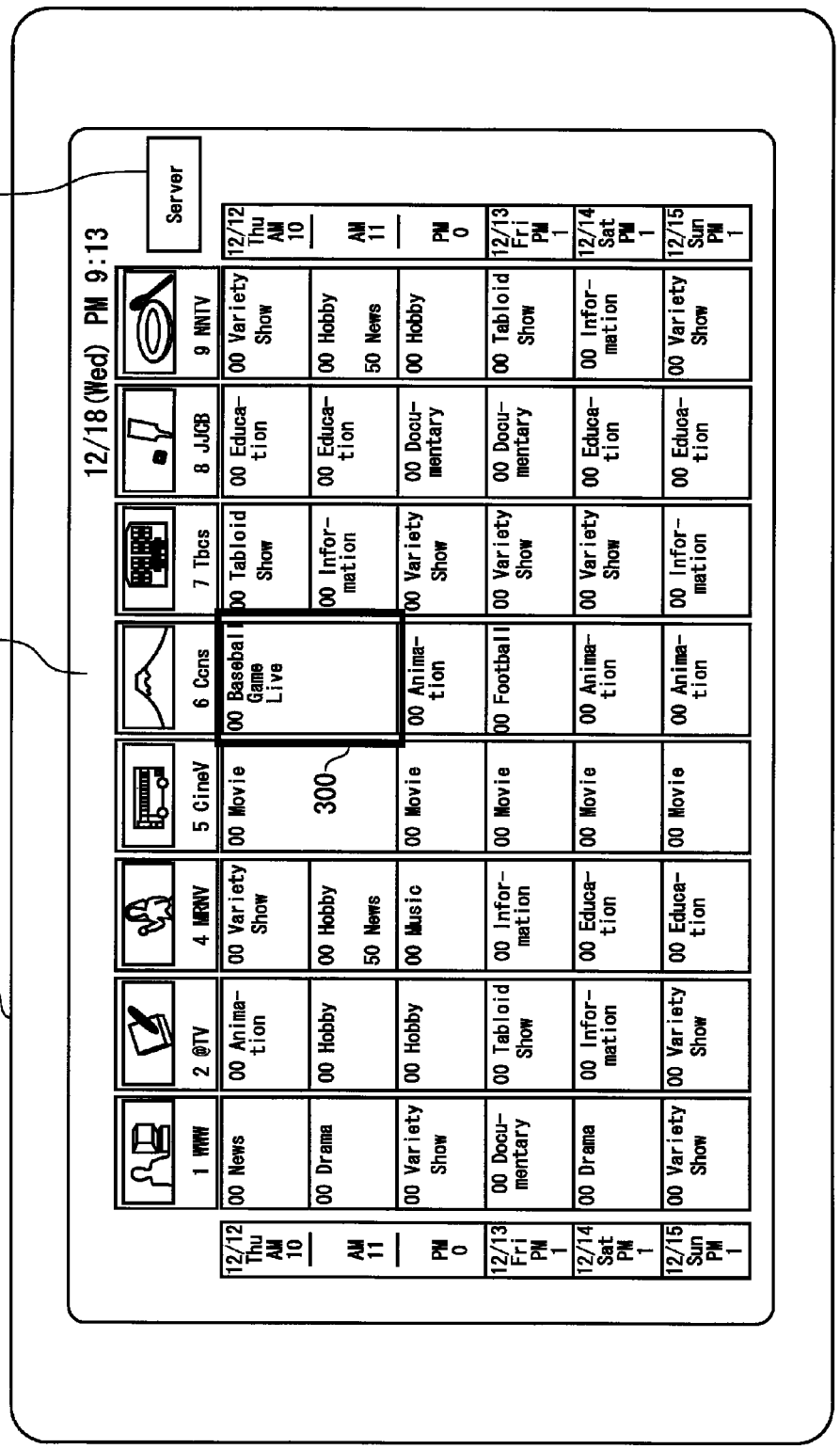
FIG. 3A is an exemplary view showing an example in which the electronic apparatus (tablet PC) according to the first embodiment displays an electronic program guide that is created using program information acquired via the Internet.
Figure 3B:
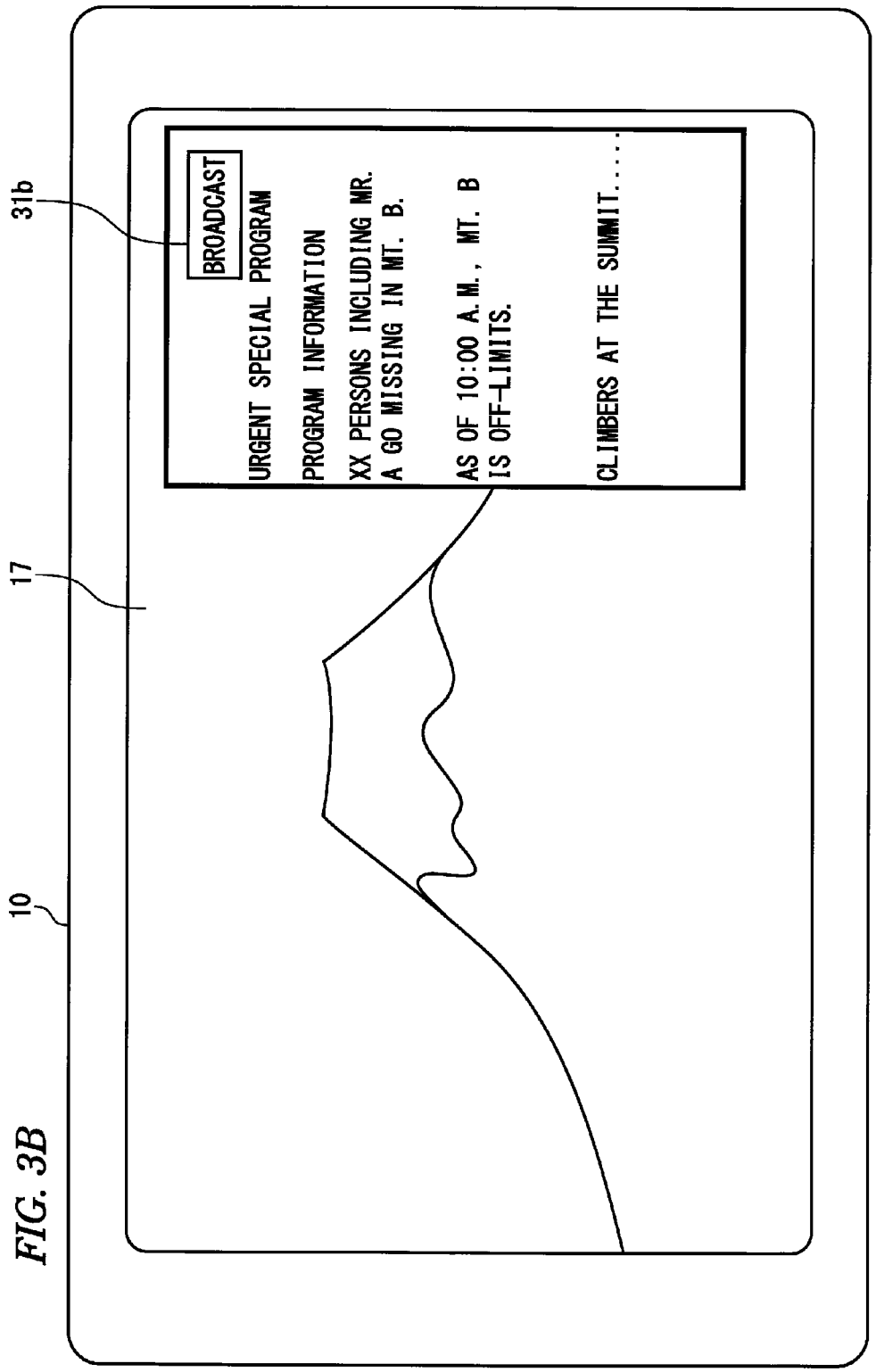
FIG. 3B is an exemplary view showing an example in which the electronic apparatus (tablet PC) according to the first embodiment receives a broadcast of a program which is designated in the electronic program guide, acquires program information thereof, and displays the program information.

FIG. 3A is an exemplary view showing an example in which the electronic apparatus (tablet PC) 10 according to the first embodiment displays an electronic program guide that is created using program information acquired via the Internet. FIG. 3B is an exemplary view showing an example in which the electronic apparatus (tablet PC) 10 according to the first embodiment receives a broadcast of a program which is designated in the electronic program guide, acquires program information thereof, and displays the program information.

Hereinafter, program information according to the first embodiment will be described.

Here, the program information is, for example, information which for use in a system (EPG (electronic program guide)) for outputting and displaying a broadcast program list showing broadcast programs on a screen of a television receiver, etc.

Namely, an electronic program guide provides information in which programs broadcasted from radio and television broadcast stations and the like are summarized in the form of a table.

For example, an electronic program guide includes a title of each program, and start and end times of each program. Moreover, the electronic program guide may further include name of a performer (name of a personality), an indication of a monaural, stereo, or bilingual broadcast, or the like, an indication of a captioned program or a non-captioned program, an indication as to whether or not each program is a new program, an indication as to whether or not each program is a special program, and the like.

In the case where the program is a movie, a drama, or the like, the electronic program guide may further include names of a country, an organization, and year in which the program was produced, event information, and the like.

Moreover, the electronic program guide may further include a description, comments, or the like of broadcast programs, such as outline of the programs or news analysis.

The information relating to broadcast programs constitutes the program information.

When, although not particularly shown in FIG. 3A, the electronic apparatus (tablet PC) 10 receives an instruction to acquire program information which is input by a user's operation on the touch pad, a touch sensor of the display screen, or the like, the electronic apparatus (tablet PC) 10 acquires program information from the sever 27 via the Internet 26. For example, this operation of the electronic apparatus (tablet PC) 10 may be implemented by the CPU 101 and the wireless LAN controller 112.

Then, the electronic apparatus (tablet PC) 10 creates an electronic program guide using the program information acquired via the Internet 26, and displays it on the video displaying section (LCD) 17. For example, this operation of the electronic apparatus (tablet PC) 10 may be implemented by the CPU 101 and the GPU 105.

In this case, namely, the created electronic program guide is displayed on the video displaying section (LCD) 17.

Also, in this case, an information source indication 31$a$ is displayed on the video displaying section (LCD) 17, so that it is indicated that the program information used in creating the electronic program guide was acquired from the server. For example, the CPU 101 and the GPU 105 may output a signal corresponding to the information source indication 31$a$ so that the video displaying section (LCD 17) displays it.

Also, in this case, as shown in a middle and slightly upper portion of the electronic program guide, "00 Baseball game live" 300 is designated by the user in the displayed electronic program guide.

Then, the electronic apparatus (tablet PC) 10 receives the broadcast of the designated program ("00 Baseball game live" 300) via the antenna 12 and a tuner 21, and outputs the program.

FIG. 3B shows an example in which the electronic apparatus (tablet PC) 10 receives a broadcast of a program designated by the user in the electronic program guide shown in FIG. 3A (a broadcast of a broadcast station which broadcasts the program) with the antenna 12 and the tuner 21, and displays the program on the video displaying section (LCD) 17.

In this example, however, a broadcast program ("Urgent special program") which is different from the program ("00 Baseball game live" 300) designated by the user is displayed as shown in FIG. 3B.

This is because the program information stored in the server 27 on the Internet 26 doesn't always easily follow up, for example, continuation of a sport live broadcast beyond a scheduled time slot or broadcasting of an emergency special program.

In the first embodiment, therefore, the program information (such as outline of a program or news analysis) of a program which is currently being watched is acquired from a broadcast wave which broadcasts the currently watched program so that the displayed program information coincides with the program ("Urgent special program") which is actually broadcasted.

In the first embodiment, if a broadcast program ("Urgent special program") which is different from the program ("00 Baseball game live" 300) designated by the user is displayed as shown in FIG. 3B, the electronic apparatus (tablet PC) 10 acquires the program information (such as an outline of a program or news analysis) of the program, which is currently being watched is acquired, from the broadcast wave broadcasting the currently watched program so that the displayed program information coincides with the program ("Urgent special program") which is actually broadcasted, and displays the program information simultaneously with and in juxtaposition to the program ("Urgent special program") which is actually broadcasted, on the video displaying section (LCD) 17. For example, this operation of the electronic apparatus (tablet PC) 10 may be implemented by the CPU 101 and the GPU 105.

In this case, the displayed program information of the currently watched program includes "Urgent special program", "Program information", "XX persons including Mr. A go missing in Mt. B.", "As of 10:00 a.m., Mt. B is off-limits.", "Climbers at the summit . . . ".

In the first embodiment, an information source indication 31b indicating that the program information of the currently watched program is information acquired from a broadcast is displayed in juxtaposition to the program information of the currently watched program. For example, this operation of the electronic apparatus (tablet PC) 10 may be implemented by the CPU 101 and the GPU 105.

Figure 4:
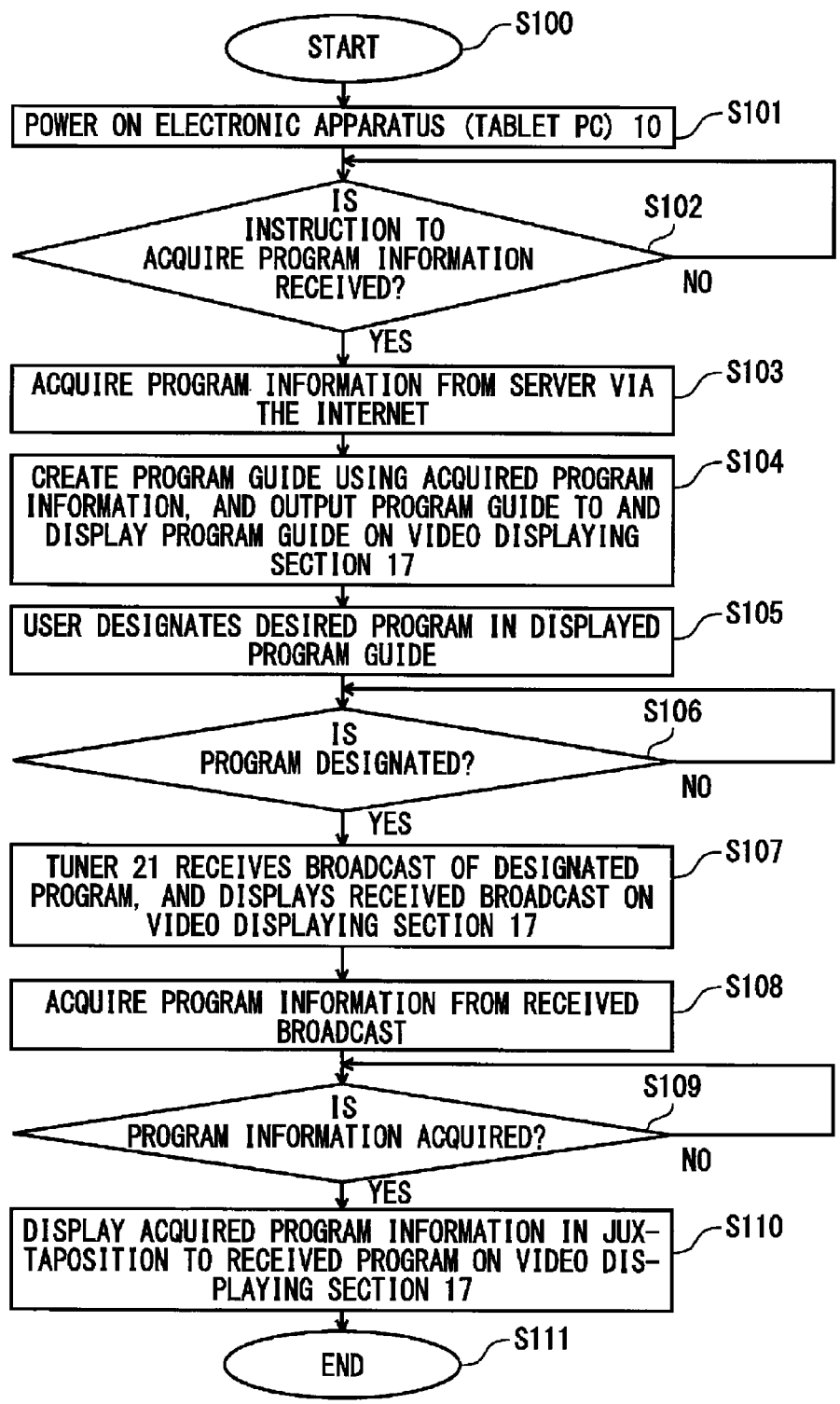
FIG. 4 is an exemplary flowchart illustrating an operation of the electronic apparatus (tablet PC) according to the first embodiment.

FIG. 4 is an exemplary flowchart illustrating the operation of the electronic apparatus (tablet PC) 10 according to the first embodiment.

Step S100 is a starting step of the flow, and then the process proceeds to step S101.

Step S101 is a step in which the electronic apparatus (tablet PC) 10 is powered on, and then the process proceeds to step S102.

Step S102 is a step in which it is determined as to whether or not an instruction to acquire program information related to an electronic program guide is received. If it is determined that the instruction to acquire the program information related to the electronic program guide is received (Yes at step S102), the process proceeds to step S103. If it is determined that the instructions to acquire the program information related to the electronic program guide is not received (No at step S102), the process at step S102 is repeated.

Step S103 is a step in which the program information is acquired from the server 27 via the Internet 26 as described above. Then, the process proceeds to step S104.

Step S104 is a step in which an electronic program guide is created using the acquired program information, and is output to and displayed on the video displaying section 17. Then, the process proceeds to step S105.

Step S105 is a step in which, as described above, the user designates a desired program in the displayed electronic program guide. Then, the process proceeds to step S106.

Step S106 is a step in which, for example, it is determined as to whether or not a program is designated by the user. If it is determined that a program is designated (Yes at Step S106), the process proceeds to step S107. If it is determined that a program is not designated yet (No at step S106), the process at step S106 is repeated.

Step S107 is a step in which, for example, a broadcast of the program, which is designated by the user, is received with the tuner 21, and output to and displayed on the video displaying section 17. Then, the process proceeds to step S108.

Step S108 is a step in which the program information (such as an outline of a program or news analysis) of the designated program is acquired from the received broadcast of the designated program. Then, the process proceeds to step S109.

Step S109 is a step in which it is determined as to whether or not the program information (such as outline of a program or news analysis) of the designated program is acquired. If it is determined that the program information of the designated program is acquired (Yes at step S109), the process proceeds to step S110. If it is determined that the program information of the designated program is not acquired (No at step S109), the process at step S109 is repeated.

Step S110 is a step in which the acquired program information (such as the outline of the program or news analysis) of the designated program is output to and displayed in juxtaposition to the received program on the video displaying section 17. Then, the process proceeds to step S111.

Step S111 is an ending step, and the process is ended.

In the first embodiment, namely, the electronic apparatus (tablet PC) 10 acquires data related to displaying of an electronic program guide from the server 27 on the Internet 26 or the like as described above.

However, in many cases, the program information (such as outline of programs or news analysis) stored in the server 27 on the Internet 26 doesn't always easily follow up, for example, continuation of a sport live broadcast beyond a scheduled time slot or an urgent special program.

Therefore, the electronic apparatus (tablet PC) 10 displays the information, which is acquired from the received broadcast wave, as the program information of the currently watched program (such as the outline of the currently watched program or news analysis).

Hereinafter, the first embodiment will be compared with an electronic apparatus (tablet PC) having one tuner (single tuner).

It is assumed that the single-tuner electronic apparatus (tablet PC) acquires program information of all receivable broadcast stations (channels).

In this case, since the electronic apparatus (tablet PC) has one tuner, the electronic apparatus needs to continuously supply electric power to the tuner for about 40 minutes in a period in which, for example, television isn't watched.

In the electronic apparatus, however, electric power accumulated in a battery is consumed for acquiring the program information.

To the contrary, the electronic apparatus (tablet PC) 10 according to the first embodiment has the configuration as described above. Thereby, the operating time of the tuner 21 is shortened, so that the power consumption of the electronic apparatus (tablet PC) 10 can be reduced.

Furthermore, for example, the electronic apparatus (tablet PC) 10 according to the first embodiment acquires the program information of the currently watched program (such as the outline of the currently watched program or news analysis) from the broadcast wave and display the acquired program information of the currently watched program. Thereby, when watching a television broadcast or the like, the user is provided with the program information (such as outline of a program or news analysis), and the convenience can be improved.

Accordingly, the power consumption of the electronic apparatus (tablet PC) 10 can be reduced while it is prevented to impair the user's convenience.

Next, an electronic apparatus (tablet PC) 20 according to a second embodiment will be described. In the second embodiment, the same or similar reference numerals are assigned to elements that are the same as or similar to those in the first embodiment. Duplicated description on the same or similar elements may be omitted.

Figure 5:
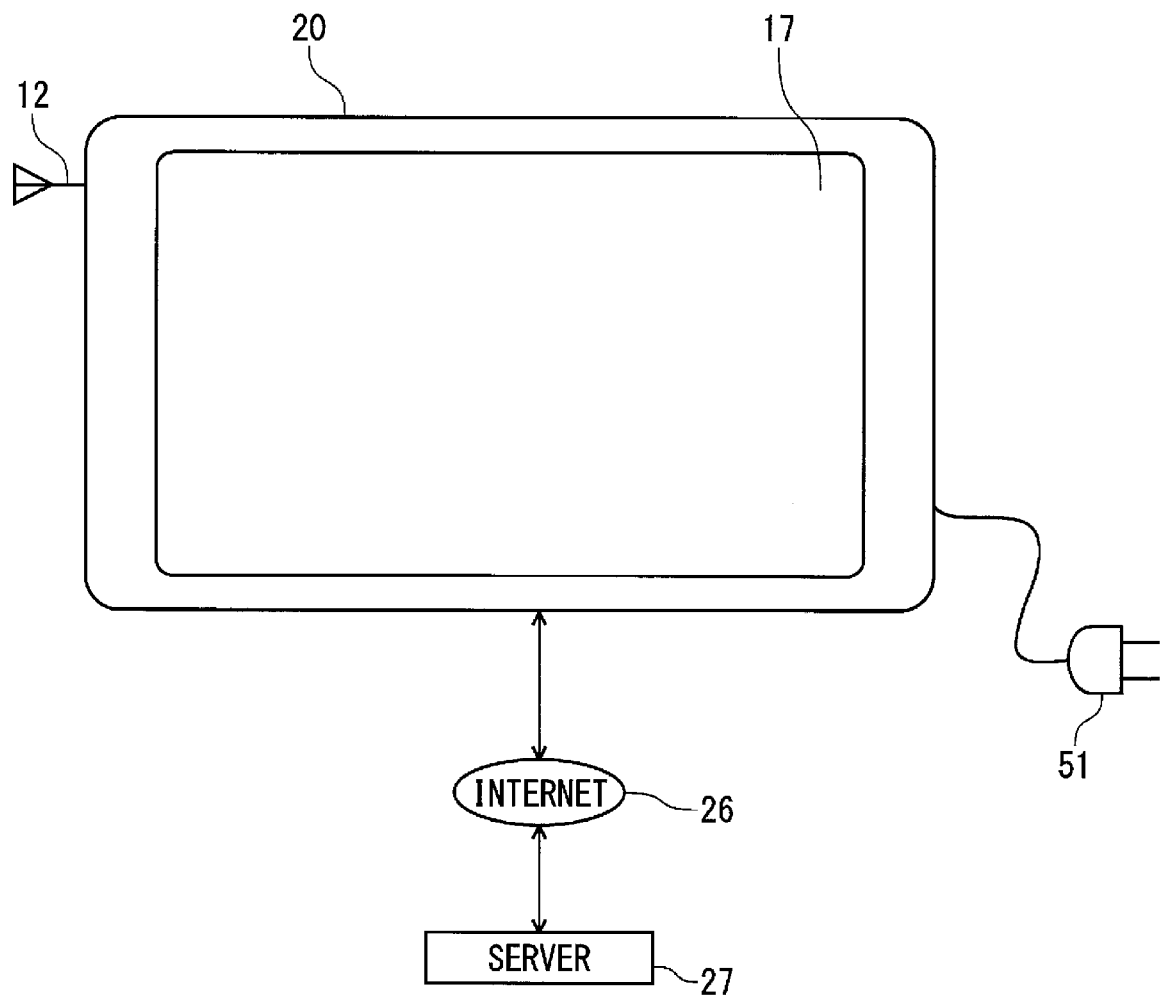
FIG. 5 is an exemplary view showing an appearance of an electronic apparatus (tablet PC) according to a second embodiment to which electric power is supplied from an outside thereof.

FIG. 5 is an exemplary view showing an appearance of the electronic apparatus (tablet PC) 20 according to second embodiment to which electric power is supplied from an outside thereof.

The electronic apparatus (tablet PC) 20 according to the second embodiment is the electronic apparatus (tablet PC) 10 shown in FIG. 1 in which a power plug 51 which can receive electric power from an external power such as a commercial power is additionally provided.

When the power plug 51 is inserted into, for example, a commercial power, it is possible to for the electronic apparatus (tablet PC) 20 to receive a power supply.

Figure 6:
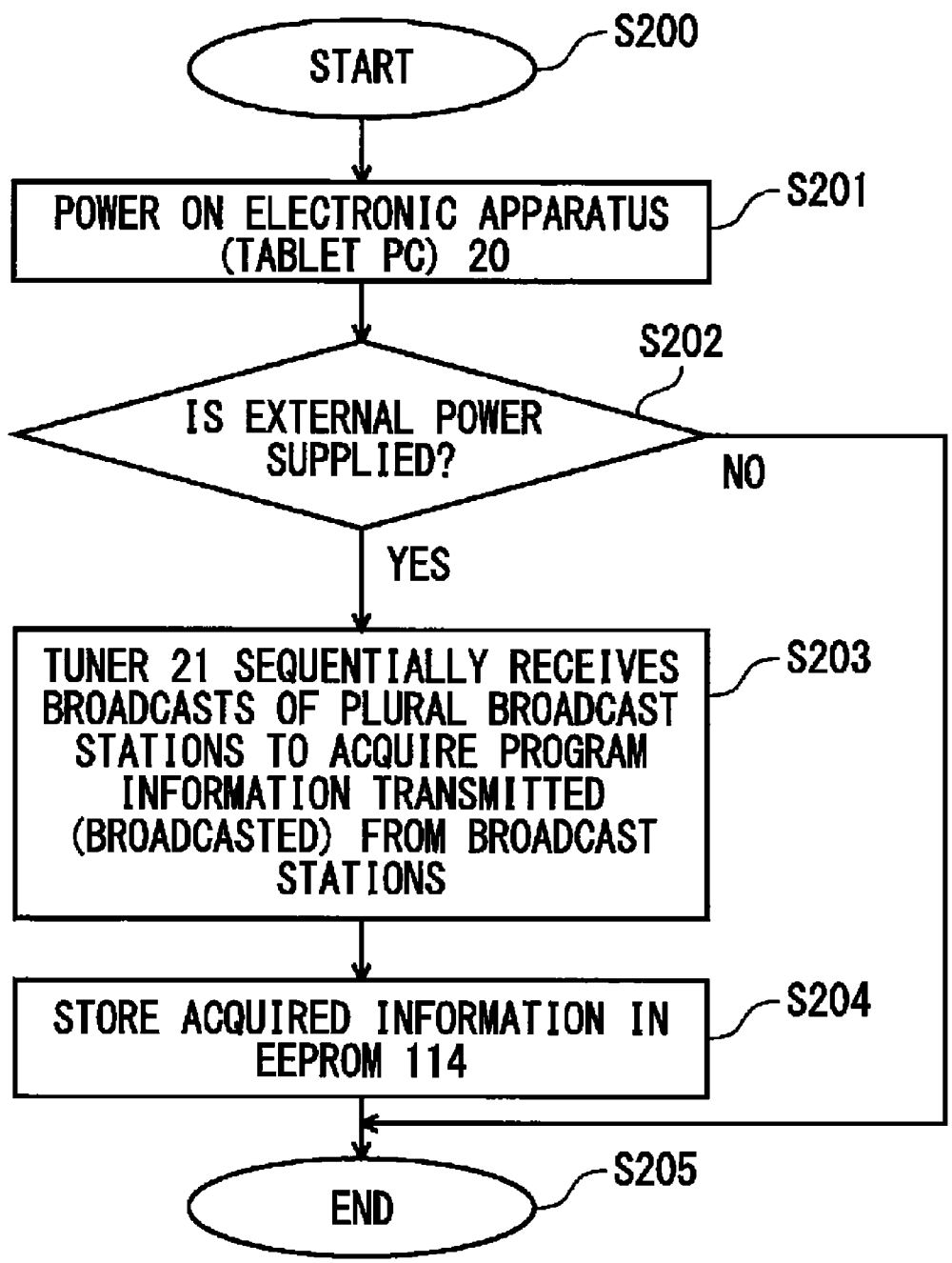
FIG. 6 is an exemplary flowchart illustrating an operation of the electronic apparatus (tablet PC) according to the second embodiment to which electric power is supplied from an outside thereof.

FIG. 6 is an exemplary flowchart illustrating the operation of the electronic apparatus (tablet PC) 20 according to the second embodiment to which electric power is supplied from the outside.

Step S200 is a starting step of the flow, and then the process proceeds to step S201.

Step S201 is a step in which the electronic apparatus (tablet PC) 20 is powered on, and then the process proceeds to step S202.

Step S202 is a step in which it is determined as to whether or not an external power (for example, a commercial power) is supplied to the electronic apparatus (tablet PC) 20. If it is determined that the external power (for example, a commercial power) is supplied (Yes at step S202), the process proceeds to step S203. If it is determined that the external power (for example, a commercial power) is not supplied (No at step S202), the process proceeds to step S205 (No).

Step S203 is a step in which the tuner 21 receives broadcasts of a plurality of broadcast stations, for example, in a sequential manner, to acquire program information transmitted (broadcasted) from the broadcast stations. Then, the process proceeds to step S204.

Step S204 is a step in which the acquired information is stored, for example, in the EEPROM 114, and then the process proceeds to step S205.

Step S205 is an ending step, and the process is ended.

FIG. 7 is an exemplary flowchart illustrating the operation of the electronic apparatus (tablet PC) 20 according to the second embodiment in the case where program information has already been stored.

Step S300 is a starting step, and then the process proceeds to step S301.

Step 301 is a step in which the electronic apparatus (tablet PC) 20 is powered on, and then the process proceeds to step S302.

Step S302 is a step in which it is determined as to whether or not an instruction to display an electronic program guide is received. If it is determined that the instruction to display the electronic program guide is received (Yes at step S302), the process proceeds to step S303. If it is determined that the instruction to display the electronic program guide is not received (No at step S302), the process in this step is repeated.

Step S303 is a step in which it is determined as to whether or not program information has already been stored in the EEPROM 114. If it is determined that program information has already been stored (Yes at step S303), the process proceeds to step S304. If it is determined that any program information has not been stored (No at step S303), the process proceeds to step S305.

Step S304 is a step in which the electronic apparatus (tablet PC) 20 creates a program guide using the program information stored in the EEPROM 114, and output the program guide to and display the program guide on the video displaying section 17. Then, the process proceeds to step S305.

Step S305 is an ending step, and the process is ended. In other words, if it is determined that any program information has not been stored in the EEPROM 114 (No at step S303), a program guide is not created at this time even through the instruction to display the program guide is received.

With this configuration, in the second embodiment, if the external power is supplied to the electronic apparatus (tablet PC) 20, for example, the tuner 21 can operate with the external power to acquire program information and store the acquired program information in the EEPROM 114 in advance.

Also, an electronic program guide can be created using the program information, which is acquired with the tuner 21, and displayed.

Also in the second embodiment, similarly to the first embodiment, the power consumption of the electronic apparatus at a time of being driven with the battery can be reduced while the user's convenience is improved.

According to the above embodiments, an electronic apparatus (for example, a tablet PC) includes an acquiring module (for example, the CPU 101 and/or the like) configured to acquire program information via a computer network (for example, the Internet 26) upon receipt of an instruction to acquire the program information.

The electronic apparatus may further include a first outputting module (for example, the CPU 101 and/or the like) configured to create a program guide using the program information acquired via the computer network and output the created program guide The electronic apparatus may further include a second outputting module (for example, the CPU 101 and/or the like) configured to receive a broadcast of a program designated in the output program guide and outputted the broadcast of the designated program The electronic apparatus may further include a third outputting module (for example, the CPU 101 and/or the like) configured to acquire program information of the designated program from the received broadcast of the designated program and output the acquired program information of the designated program.

The program information of the designated program and the received broadcast of the designated program may be configured to be outputted to and displayed on the video displaying section 17 in juxtaposition to the received broadcast of the designated program.

Although not particularly shown, the electronic apparatus may further include a battery which can supply an electric power.

For example, the program information which is acquired via the communication network (for example, the Internet 26) may be information acquired from the external server 27.

The electronic apparatus may further include a power receiving module (for example, the power plug 51 and/or the like) configured to receive electric power from a power source outside of the electronic apparatus. When the power receiving module receives the electronic power from the power source, the second outputting module may be configured to receive broadcasts from a plurality of broadcast stations and the third outputting module may be configured to acquire program information of the plurality of broadcast stations from the received broadcasts.

In the electronic apparatus, when the third outputting module acquires the program information of the plurality of broadcast stations, the first outputting module (the CPU 101 and/or the like) may be configured to create a program guide using the program information of the plurality of broadcast stations and output the program guide.

The electronic apparatus may further include a fourth outputting module (the CPU 101 and/or the like) configured to output an indication (for example, the information source indication 31*b* and/or the like) that the program information of the designated program is acquired from the broadcast of the designated program.

With the above configuration, in the embodiments, the power consumption of the electronic apparatus can be reduced while the user's convenience is improved.

The same effects as those of the embodiments can be easily achieved simply by installing and executing a program for executing the procedures of the control process according to any of the embodiments in a general-purpose computer through a computer-readable storage medium storing the program.

The above embodiments are not limited to description itself. When any of the embodiments is put into practical use, respective elements in the embodiment may be modified in various manners so long as the modification does not depart from the gist of the embodiment.

Also, various modified embodiments may be made by appropriately combining plural elements described in the respective embodiments.

For example, some elements may be eliminated from all the elements described in each embodiment. Furthermore, elements in different embodiments may be combined appropriately.

What is claimed is:

1. An electronic apparatus comprising:
    a battery configured to store electric power for the electronic apparatus, thereby allowing the electronic apparatus to be operated when disconnected from a power source outside of the electronic apparatus;
    a power receiver configured to receive electric power from the power source;
    a first receiver configured to acquire first program information corresponding to plural programs via a computer network upon receipt of an instruction to acquire program information;
    a second receiver configured to receive broadcasts from a plurality of broadcast stations via a communication medium that is distinct from the computer network; and
    a processor configured
        to create a first program guide using the first program information acquired via the computer network,
        to receive from the second receiver a broadcast of a program designated by a user in the first program guide, the second receiver configured to receive the broadcast of the designated program via the communication medium that is distinct from the computer network, and
        to acquire second program information of the designated program from the received broadcast of the designated program, wherein
    the processor is configured to create a second program guide using the first program information and the second program information after creating the first program guide,
    the second receiver is configured to receive third program information corresponding to plural programs from the plurality of broadcast stations, when the electronic apparatus is powered by the power source, and
    the second receiver is configured not to receive program information from the plurality of broadcast stations but receive the second program information of the designated program, when the electronic apparatus is powered by the battery.

2. The electronic apparatus of claim 1, wherein the second program information of the designated program and the received broadcast of the designated program are configured to be output in juxtaposition to each other.

3. The electronic apparatus of claim 2, wherein the first receiver is configured to acquire the first program information from an external server via the computer network.

4. The electronic apparatus of claim 2, wherein the processor is configured to output an indication that the second program information of the designated program is acquired from the received broadcast of the designated program.

5. The electronic apparatus of claim 1, wherein the first receiver is configured to acquire the first program information from an external server via the computer network.

6. The electronic apparatus of claim 1, wherein when the second receiver receives the third program information of the plurality of broadcast stations, the processor is configured to create a third program guide using the third program information of the plurality of broadcast stations.

7. The electronic apparatus of claim 1, wherein the processor is configured to output an indication that the second program information of the designated program is acquired from the received broadcast of the designated program.

8. The electronic apparatus of claim 1, wherein the processor is configured to create the second program guide in such a manner that
    the first program information provides data for the second program guide relating to programs not currently viewed, and
    the second program information provides data for the second program guide relating to the designated program, currently viewed.

9. A method of controlling an electronic apparatus, the method comprising:
    acquiring from a first receiver first program information corresponding to plural programs via a computer network upon receipt of an instruction to acquire program information;
    creating a first program guide using the first program information acquired via the computer network;
    receiving from a second receiver broadcasts from a plurality of broadcast stations via a communication medium that is distinct from the computer network;
    receiving from the second receiver a broadcast of a program designated by a user in the first program guide, the second receiver configured to receive the broadcast of the designated program via the communication medium that is distinct from the computer network;

acquiring second program information of the designated program from the received broadcast of the designated program;

creating a second program guide using the first program information and the second program information after creating the first program guide;

determining whether the electronic apparatus is powered by a power source outside of the electronic apparatus or powered by a battery of the electronic apparatus, the battery configured to store electric power for the electronic apparatus, thereby allowing the electronic apparatus to be operated when disconnected from the power source outside of the electronic apparatus; and when the electronic apparatus is determined to be powered by the power source, receiving third program information corresponding to plural programs from the plurality of broadcast stations, and when the electronic apparatus is determined to be powered by the battery, not receiving program information from the plurality of broadcast stations but receiving the second program information of the designated program.

10. The method of claim 9, wherein the second program information of the designated program and the received broadcast of the designated program are configured to be output in juxtaposition to each other.

11. The method of claim 9, further comprising acquiring the first program information from an external server via the computer network.

12. The method of claim 9, further comprising:
outputting an indication that the second program information of the designated program is acquired from the received broadcast of the designated program.

13. The method of claim 9, wherein when creating the second program guide:
the first program information provides data for the second program guide relating to programs not currently viewed, and
the second program information provides data for the second program guide relating to the designated program, currently viewed.

14. A non-transitory computer-readable storage medium storing a program that causes a computer to execute a process to control an electronic apparatus, the process comprising:
acquiring from a first receiver first program information corresponding to plural programs via a computer network upon receipt of an instruction to acquire program information;
creating a first program guide using the first program information acquired via the computer network;
receiving from a second receiver broadcasts from a plurality of broadcast stations via a communication medium that is distinct from the computer network;
receiving from the second receiver a broadcast of a program designated by a user in the first program guide, the second receiver configured to receive the broadcast of the designated program via the communication medium that is distinct from the computer network;
acquiring second program information of the designated program from the received broadcast of the designated program;
creating a second program guide using the first program information and the second program information after creating the first program guide;
determining whether the electronic apparatus is powered by a power source outside of the electronic apparatus by a battery of the electronic apparatus, the battery configured to store electric power for the electronic apparatus, thereby allowing the electronic apparatus to be operated when disconnected from the power source outside of the electronic apparatus; and
when the electronic apparatus is determined to be powered by the power source, receiving third program information corresponding to plural programs from the plurality of broadcast stations, and when the electronic apparatus is determined to be powered by the battery, not receiving program information from the plurality of broadcast stations but receiving the second program information of the designated program.

15. The non-transitory computer-readable storage medium of claim 14, wherein the second program information of the designated program and the received broadcast of the designated program are configured to be output in juxtaposition to each other.

16. The non-transitory computer-readable storage medium of claim 14, wherein the process further comprises acquiring the first program information from an external server via the computer network.

17. The non-transitory computer-readable storage medium of claim 14, wherein the process further comprises:
outputting an indication that the second program information of the designated program is acquired from the received broadcast of the designated program.

18. The non-transitory computer-readable storage medium of claim 14, wherein when creating the second program guide:
the first program information provides data for the second program guide relating to programs not currently viewed, and
the second program information provides data for the second program guide relating to the designated program, currently viewed.

* * * * *